United States Patent

Balling

[11] Patent Number: 5,946,514
[45] Date of Patent: Aug. 31, 1999

[54] CAMERA WITH SELF-TIMER

[75] Inventor: Edward N. Balling, Rochester, N.Y.

[73] Assignee: Eastman Kodak Company, Rochester, N.Y.

[21] Appl. No.: 09/088,975

[22] Filed: Jun. 2, 1998

[51] Int. Cl.$^6$ .............................. G03B 9/64; G03B 17/38
[52] U.S. Cl. .......................... 396/472; 396/473; 396/502
[58] Field of Search .............................. 396/59, 264, 472, 396/473, 474, 502, 544

[56] References Cited

U.S. PATENT DOCUMENTS

| | | | |
|---|---|---|---|
| 1,185,237 | 5/1916 | Olson | 396/474 |
| 3,216,340 | 11/1965 | Hennig | 396/473 |
| 3,831,184 | 8/1974 | Morse | 396/474 |
| 5,089,836 | 2/1992 | Chern | 396/59 |
| 5,619,295 | 4/1997 | Seya et al. | 356/376 |
| 5,678,107 | 10/1997 | Arai et al. | 396/502 |
| 5,822,639 | 10/1998 | Salvas et al. | 396/448 |

FOREIGN PATENT DOCUMENTS

| | | |
|---|---|---|
| 2-71238 | 3/1990 | Japan . |
| 3-171126 | 7/1991 | Japan . |
| 3-80423 | 8/1991 | Japan . |
| 7-104377 | 4/1995 | Japan . |

*Primary Examiner*—Eddie C. Lee
*Attorney, Agent, or Firm*—Roger A. Fields

[57] ABSTRACT

A camera comprises a shutter release that is manually depressible to initiate picture-taking, and a delayed action device for automatically depressing the shutter release to initiate picture-taking after a predetermined interval of time has elapsed. The shutter release has an engageable portion that can be engaged to depress the shutter release. The delayed action device has a setting piece that is movable in a forward direction to a cocked position to move an engaging portion of the setting device from a closer side to a farther side of the engageable portion of the shutter release and is returned in a reverse direction with the engaging portion in engagement with the farther side to automatically depress the shutter release. The engaging portion of the delayed action device is constructed to allow the shutter release to be manually depressed when the setting device is in the cocked position, in order to obviate return of the setting device in the reverse direction to automatically depress the shutter release.

6 Claims, 7 Drawing Sheets

5,946,514

CAMERA WITH SELF-TIMER

FIELD OF THE INVENTION

The invention relates generally to the field of photography, and in particular to a camera with a self-timer which is otherwise referred to as a delayed action shutter release or delayed action device.

BACKGROUND OF THE INVENTION

It is well known for a camera to be provided with a self timer or delayed action device that automatically depresses a shutter release in the camera to initiate picture-taking after a predetermined interval of time has elapsed. Normally, the shutter release is manually depressible to initiate picture-taking. However, when the delayed action device is used, only it can operate the shutter release. Actuation of the delayed action device to take a picture delays operation of the shutter release to initiate picture-taking for 10–20 seconds, which is long enough for the photographer to take a position in the picture.

SUMMARY OF THE INVENTION

According to the invention, a camera comprising a manual shutter release that is manually operated to initiate picture-taking, and a delayed action shutter release that when manually set will automatically initiate picture-taking after a predetermined time delay, is characterized in that:

the delayed action shutter release is constructed to allow manual operation of the manual shutter release to initiate picture-taking when the delayed action shutter release has been manually set to automatically initiate picture.

More specifically, a camera comprising a shutter release that is manually depressible to initiate picture-taking, and a delayed action device for automatically depressing the shutter release to initiate picture-taking after a predetermined interval of time has elapsed, is characterized in that:

the shutter release has an engageable portion that can be engaged to depress the shutter release; and the delayed action device has a setting piece that is movable in a forward direction to a cocked position to move an engaging portion of the setting device from a closer side to a farther side of the engageable portion of the shutter release and is returned in a reverse direction with the engaging portion in engagement with the farther side to automatically depress the shutter release, and the engaging portion is constructed to allow the shutter release to be manually depressed when the setting device is in the cocked position to obviate return of the setting device in the reverse direction in order to automatically depress the shutter release.

DETAILED DESCRIPTION OF THE INVENTION

The invention is disclosed as being embodied preferably in a camera with a self timer. Because the features of a camera with a self timer are generally known, the description which follows is directed in particular only to those elements forming part of or cooperating directly with the disclosed embodiment. It is to be understood, however, that other elements may take various forms known to a person of ordinary skill in the art.

Figure 1:
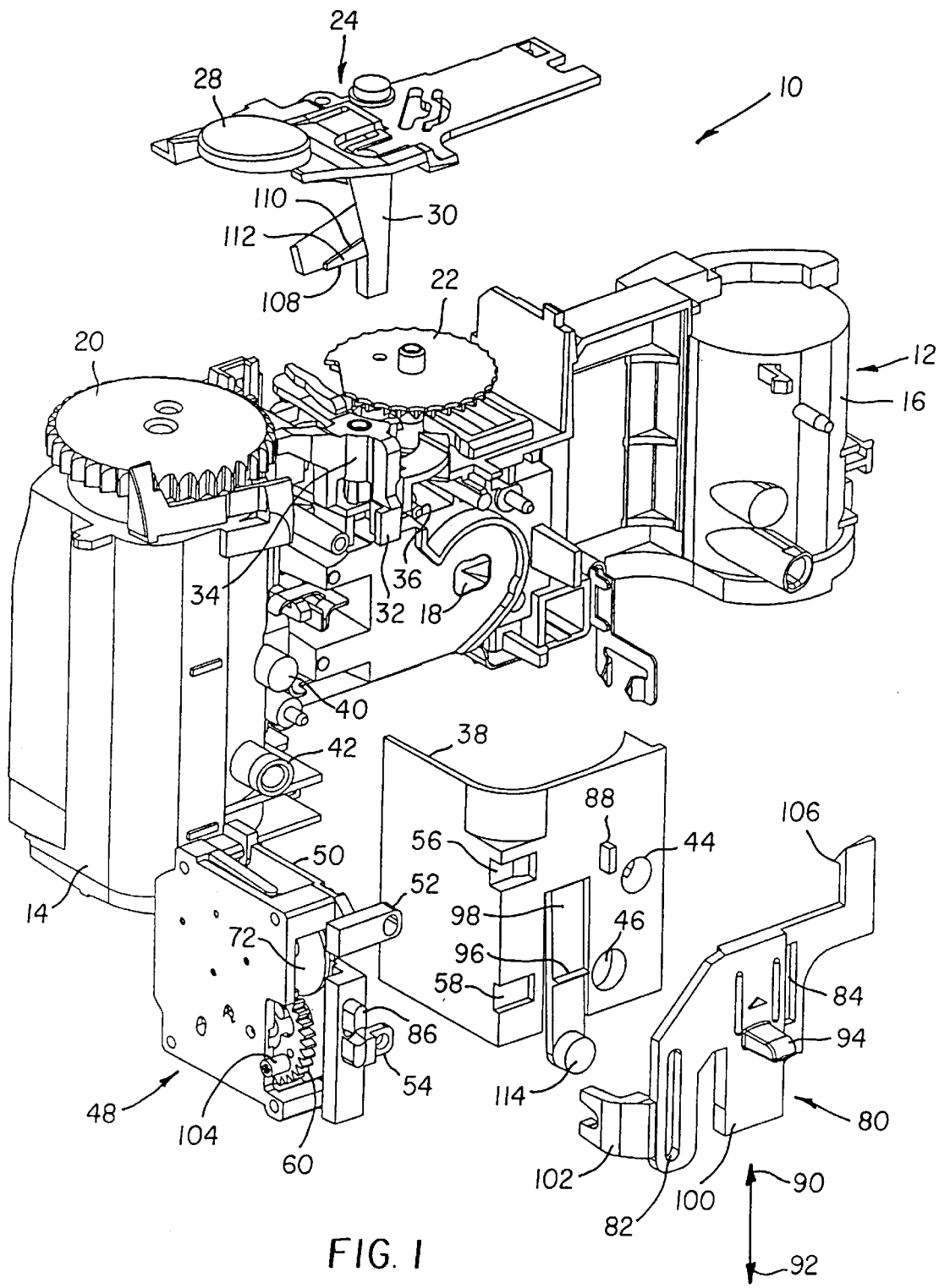
FIG. 1 is an exploded front perspective view of a camera with a self timer or delayed action shutter release pursuant to a preferred embodiment of the invention.
Figure 2:
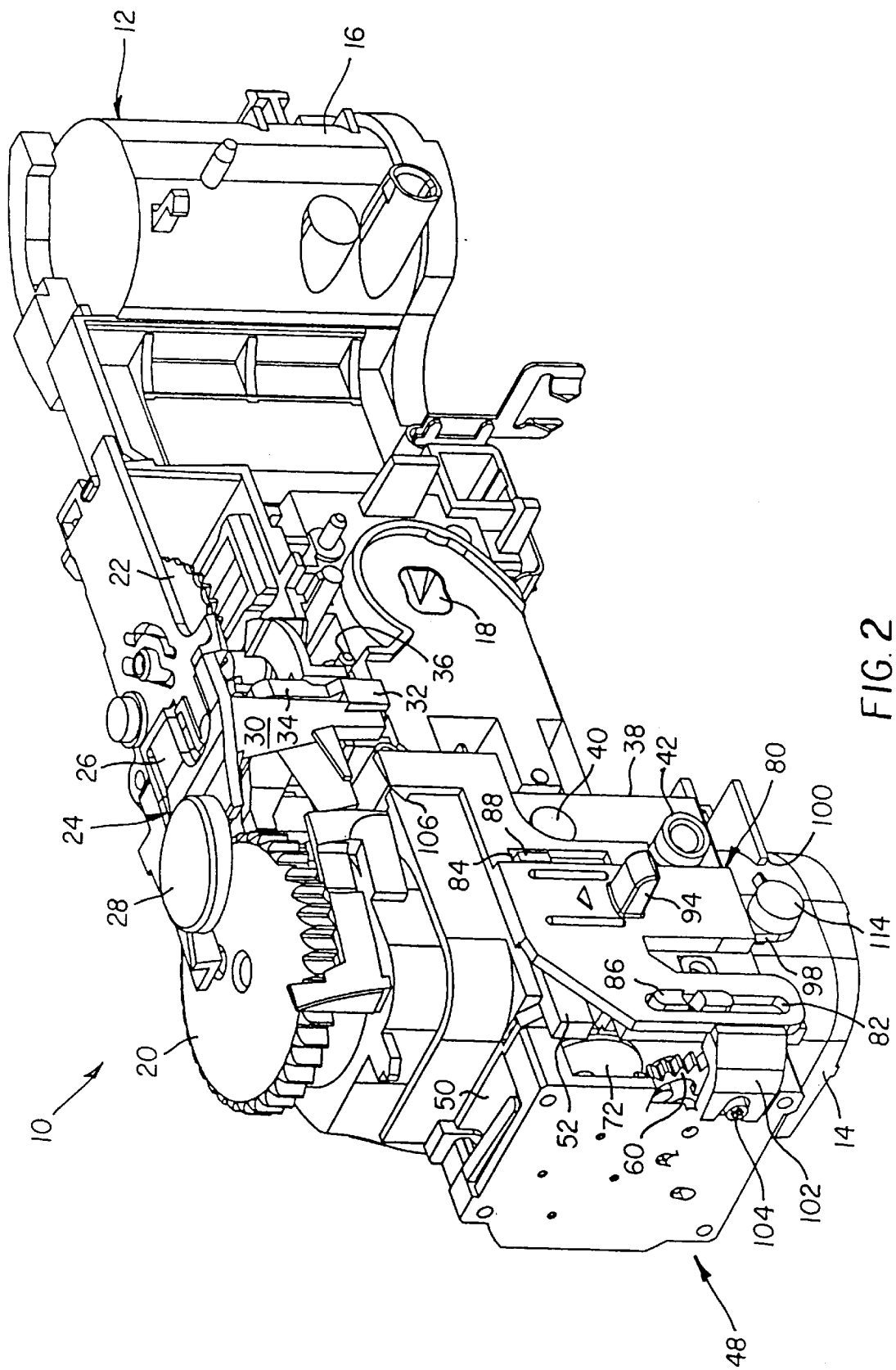
FIG. 2 is an assembled front perspective view of the camera with the self timer.

Referring now to the drawings, FIGS. 1 and 2 partially show a onetime-use camera 10 including a main body part 12. The main body part 12 has one end portion 14 that defines a rearwardly open cartridge receiving chamber (not shown) and another end portion 16 that defines an unexposed film roll chamber (not shown). A front exposure aperture 18 is located between the end portions 14 and 16 for admitting ambient light to expose successive sections of a filmstrip (not shown) originally stored in roll form in the unexposed film roll chamber. A film winding thumbwheel 20 is rotatably supported in coaxial engagement with the film spool in a film cartridge (not shown) within the cartridge receiving chamber to wind each exposed section of the filmstrip into the film cartridge. An exposure counter 22 provides a current count of the film sections that remain to be exposed.

A known shutter blade (not shown) is pivotally supported on the main body part 12 for pivotal opening and closing movement to momentarily uncover and then recover the exposure aperture 18 to expose each film section. A torsion return spring (not shown) urges the shutter blade to recover the exposure aperture 18. Opening movement of the shutter blade would be clockwise in FIG. 1, and closing movement of the shutter blade would be counter-clockwise in FIG. 1.

Figure 3:
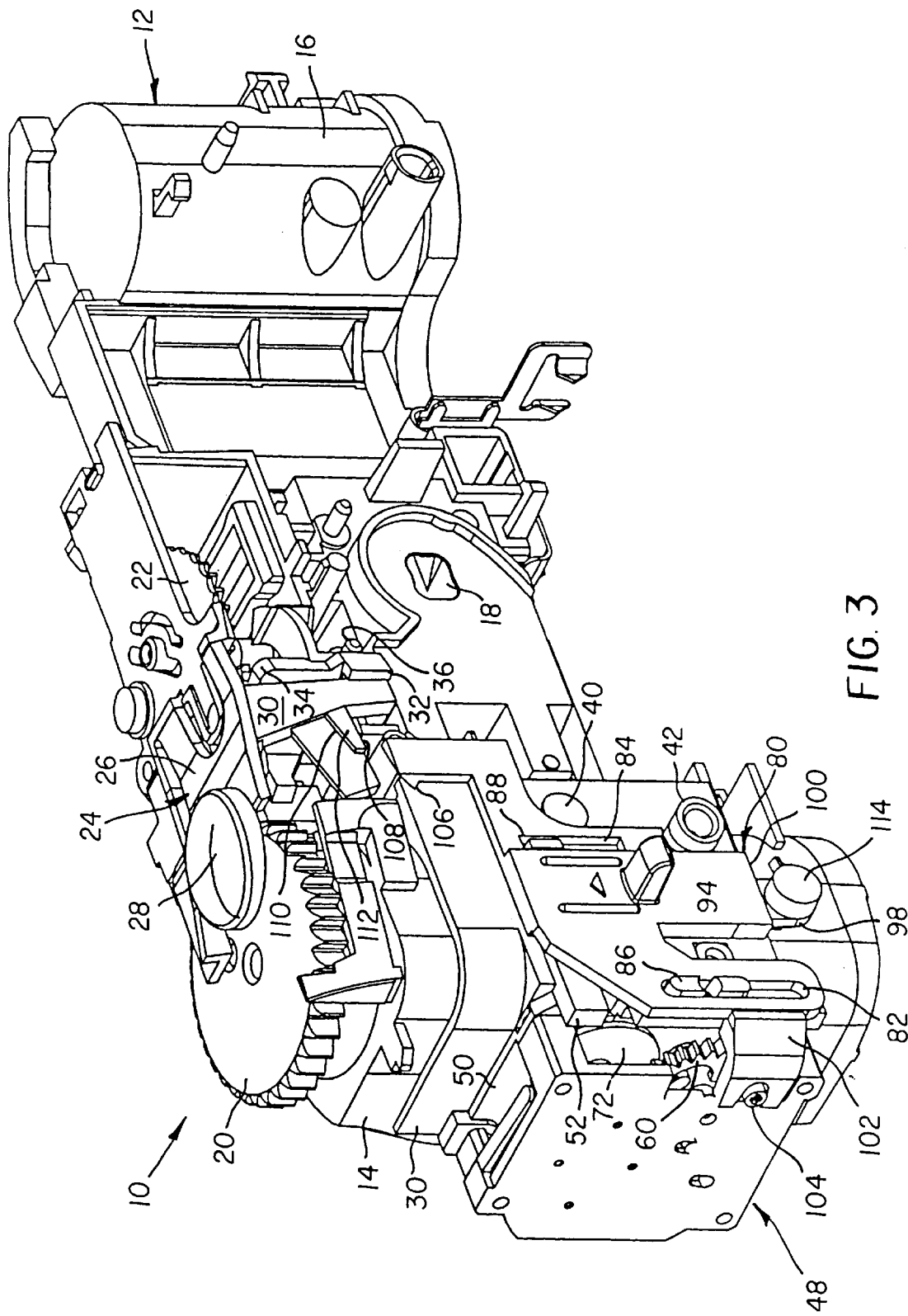
FIG. 3 is a front perspective view similar to FIG. 3, showing manually depression of a manual shutter release.

A shutter release component 24, shown in FIGS. 1–3, is secured to the main body part 12 and has a resilient cantilevered beam 26 with a free end that is a manually depressible shutter release button 28. An actuating finger 30 of the shutter release component 24 depends from the cantilevered beam 26 to extend behind a right-angled tab 32 on a known metering lever 34. The metering lever 34 is pivotally supported on the main body part 12 and normally engages a known spring-driven high energy lever 36, pivotally supported on the main body part, to hold the high energy lever against the spring urging. As viewed in FIG. 3, when the shutter release button 28 is manually depressed, the cantilevered beam 26 is bent (beginning at the shutter release button) to make the actuating finger 30 swing counter-clockwise and in turn pivot the metering lever 34 counter-clockwise. When the metering lever 34 is pivoted counter-clockwise, it releases the high energy lever 36 which briefly strikes the shutter blade (not shown) to pivot the shutter blade open to uncover the exposure aperture 18. The torsion return spring (not shown) for the shutter blade pivots the shutter blade closed to recover the exposure aperture 18.

Figure 7:
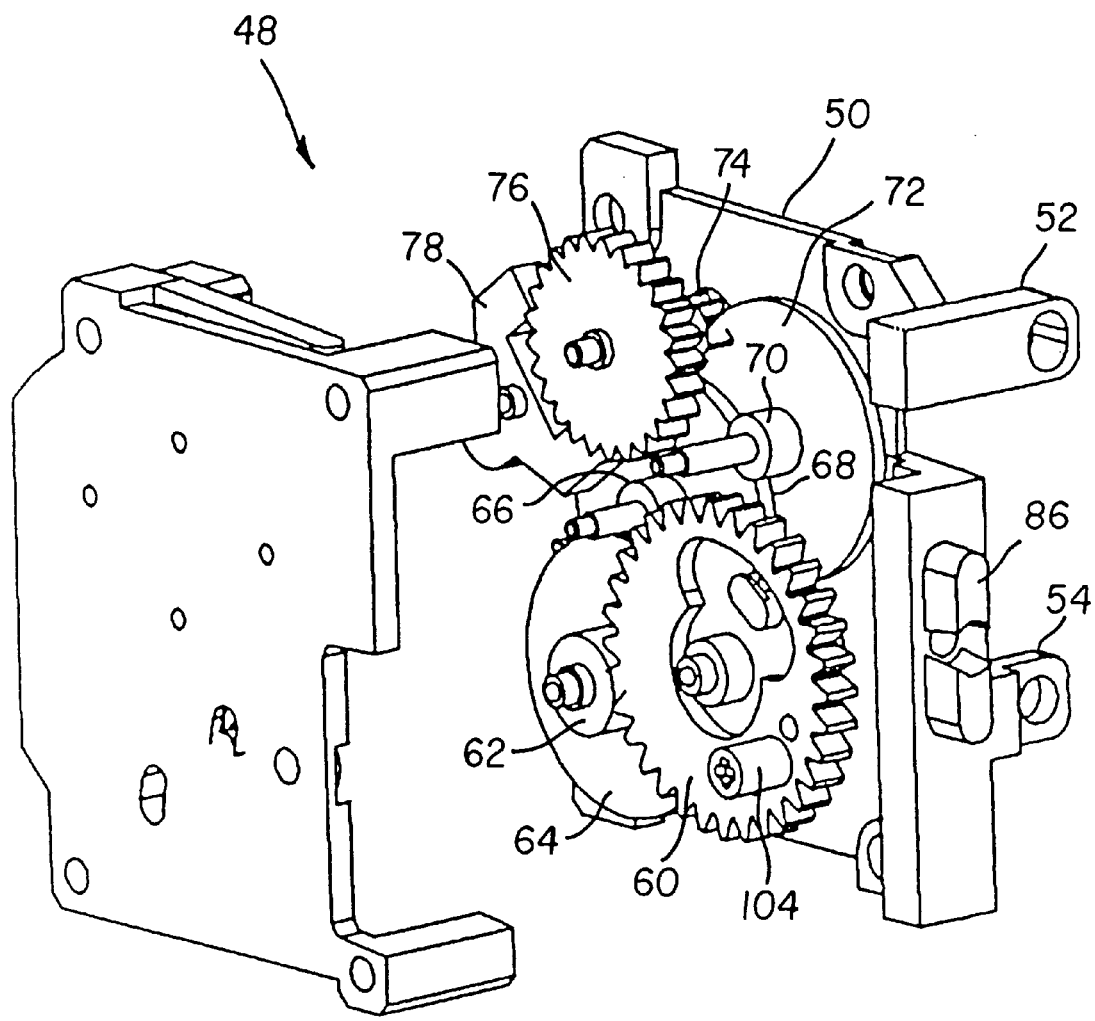
FIG. 7 is an exploded perspective view of the self timer.

As shown in FIG. 1, a mounting plate 38 is secured to the end portion 14 of the main body part 12 by means of two projections 40 and 42 on the end portion that extend through respective holes 44 and 46 in the mounting plate. A known timer 48 includes a base plate 50 with two arms 52 and 54 that are fit into respective recesses 56 and 58 in the mounting plate 38 to secure the timer to the mounting plate. Several meshing gears are rotationally supported on the base plate 50. These are a timer gear 60 that is urged clockwise in FIGS. 1 and 7 by a torsion return spring (not shown), a first pinion gear 62 in mesh with the timer gear, a first spur gear 64 coaxial with the first pinion gear, a second pinion 66 gear in mesh with the first spur gear, a second spur gear 68 coaxial with the second pinion gear, a third pinion gear 70 in mesh with the second spur gear, a third spur gear 72 coaxial with the third pinion gear, a fourth pinion gear 74 in mesh with the third spur gear, and a fifth spur gear 76 coaxial with the fourth pinion gear. See FIG. 7. An escapement 78 is pivotally supported on the base plate 50 to pivot back and forth into engagement with the fifth spur gear 76.

Figure 4:
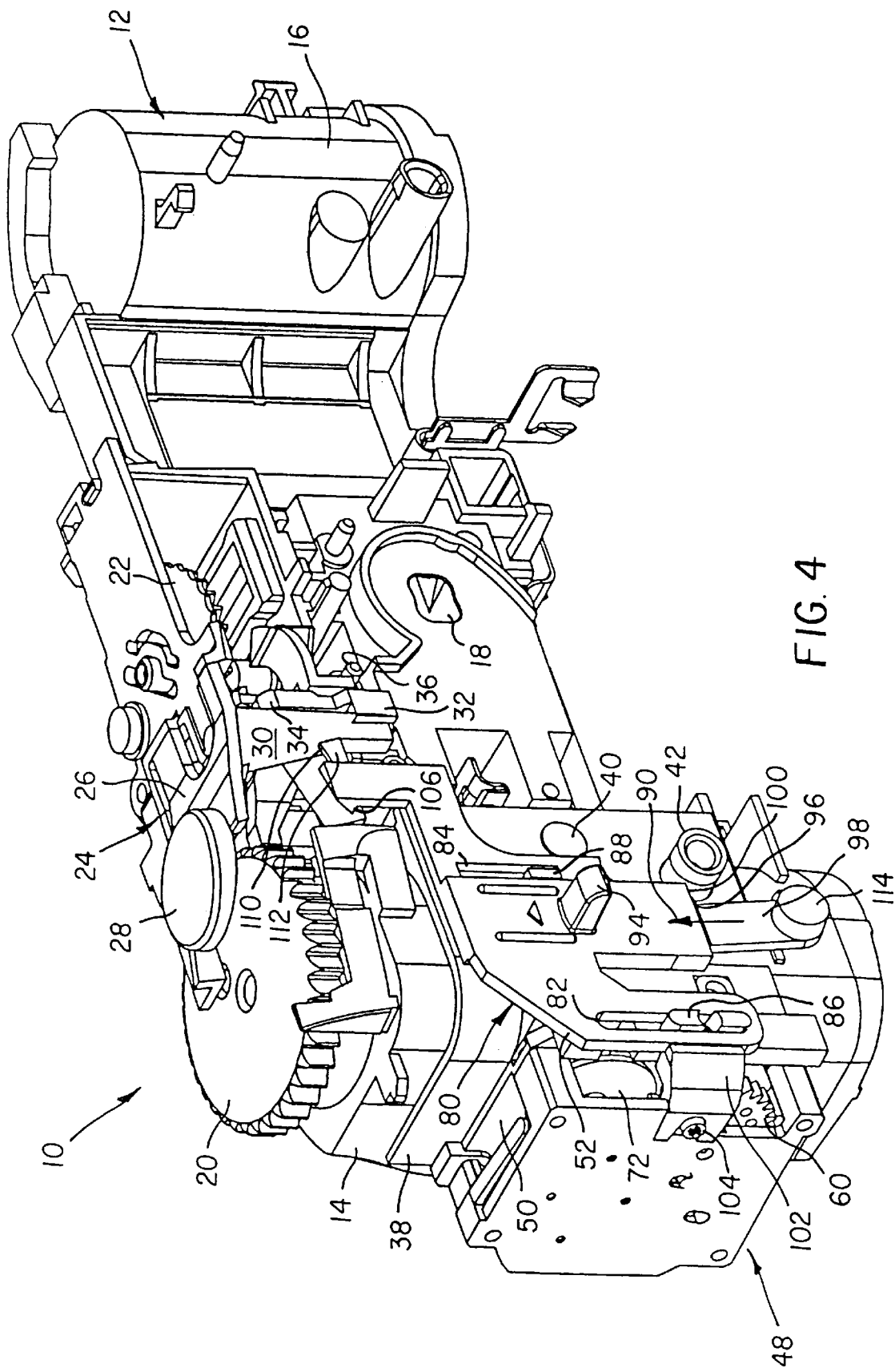
FIG. 4 is a front perspective view similar to FIG. 3, showing the self timer being set for operation.
Figure 5:
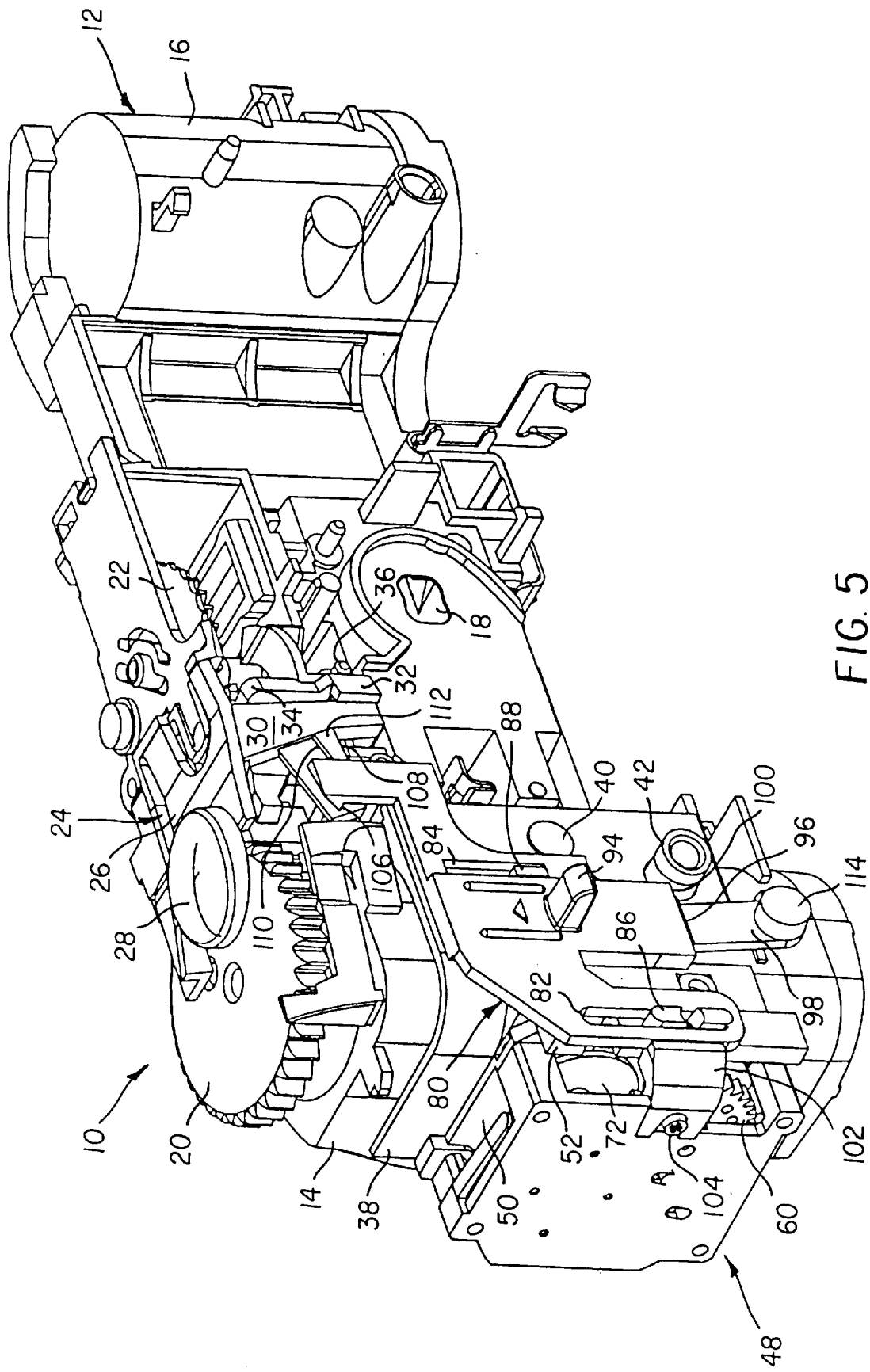
FIG. 5 is a front perspective view similar to FIG. 3, showing manual depression of the shutter release when the self timer is set for operation.
Figure 6:
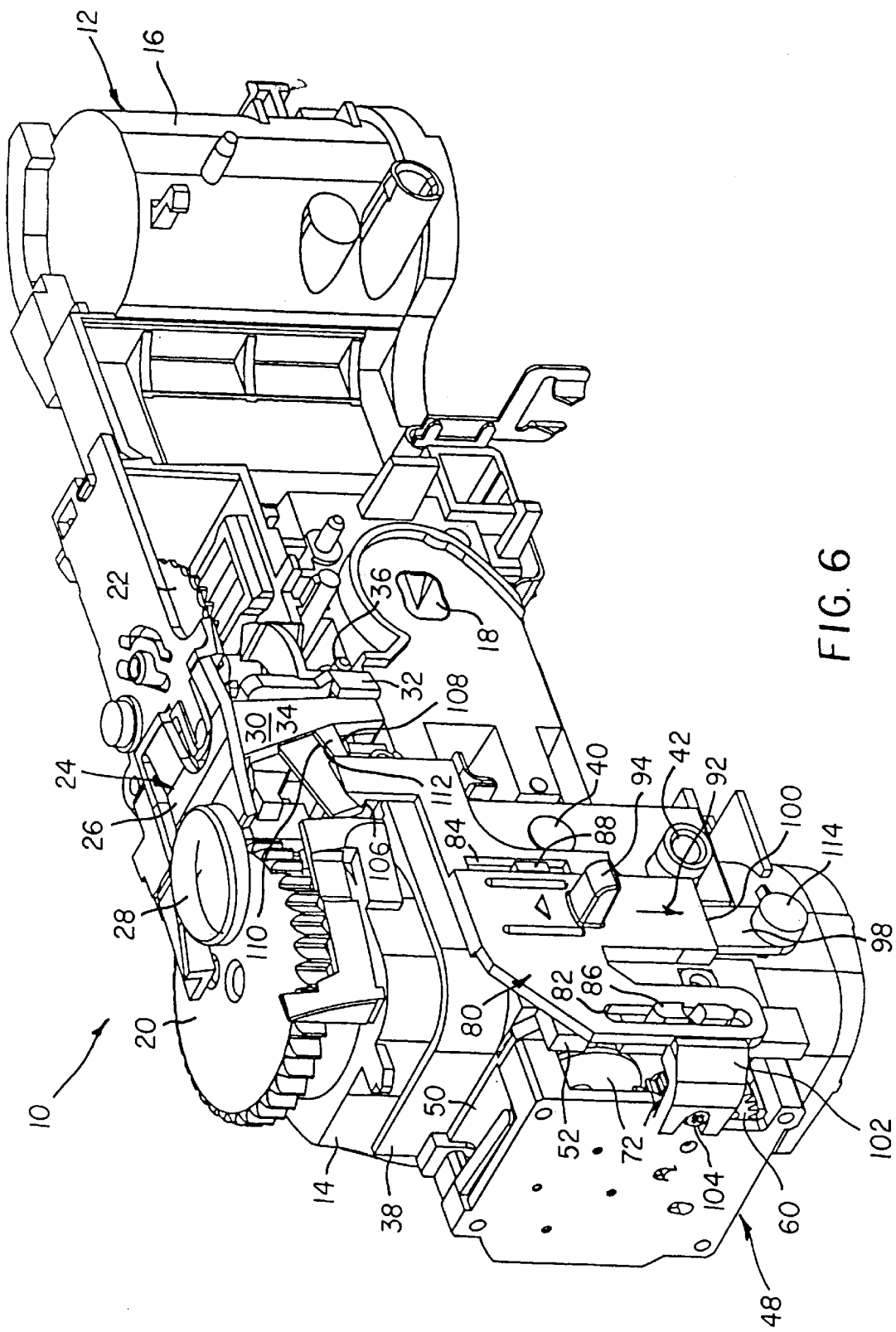
FIG. 6 is a front perspective view similar to FIG. 3, showing operation of the self timer.

A setting slide 80 has respective slots 82 and 84 in which are located a projection 86 on the base plate 50 and a projection 88 on the mounting plate 38, to permit translation of the setting slide in forward and reverse directions indicated by the arrows 90 in FIG. 4 and 92 in FIG. 6. When a knob 94 is manually pushed in the forward direction 90, the setting slide 80 is similarly moved to a cocked position, shown in FIG. 4, in which a catch 96 on a resilient cantilevered beam 98 of the mounting plate 38 engages one end 100 of the setting slide to prevent the setting slide from being returned in the reverse direction 92. As the setting slide 80 is translated in the forward direction 90 to its cocked position, a right-angled extension 102 of the setting slide in continuous engagement with a lug 104 on the timer gear 60 rotates (i.e. winds up) the timer gear counter-clockwise 126° in FIG. 4 against the contrary urging of the torsion return spring (not shown) for the timer gear and a hook or engaging portion 106 on the setting slide is moved from a closer side 108 of a follower or engageable portion 110 on the actuating finger 30 to a farther side 112 of the follower (i.e. closer to and farther from the hook before the hook is moved). Since the hook 106 has been moved past (beyond) the farther side 112 of the follower 110, the shutter release button 28 can be manually depressed to pivot the actuating finger 30 counter-clockwise in FIG. 6 and cause the high energy lever 36 to briefly strike the shutter blade (not shown) to pivot the shutter blade open to momentarily uncover the exposure aperture 18. This is shown in FIG. 5. Alternatively as shown in FIG. 6, a setting release button 114 at a free end of the cantilevered beam 98 can be manually depressed to separate the catch 96 from the end 100 of the setting slide 80. Consequently, the torsion return spring for the timer gear 60 rotates (i.e. winds down) the timer gear clockwise 126° in FIG. 6 for about 12 seconds to translate the setting slide 80 in the reverse direction 92 and cause the hook 106 to bear against (engage) the farther side 112 of the follower 110 and pivot the actuating finger 30 counter-clockwise in FIG. 6 and cause the high energy lever 36 to briefly strike the shutter blade (not shown) to pivot the shutter blade open to momentarily uncover the exposure aperture 18.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. one end portion
16. another end portion
18. front exposure aperture
20. film winding thumbwheel
22. exposure counter
24. shutter release component
26. cantilevered beam
28. shutter release button
30. actuating finger
32. right-angled tab
34. metering lever
36. high energy lever
38. mounting plate
40. projection
42. projection
44. hole
46. hole
48. timer
50. base plate
52. arm
54. arm
56. recess
58. recess
60. timer gear
62. first pinion gear
64. first spur gear
66. second pinion gear
68. second spur gear
70. third pinion gear
72. third spur gear
74. fourth pinion gear
76. fifth spur gear
78. escapement
80. setting slide
82. slot
84. slot
86. projection
88. projection
90. forward direction
92. reverse direction
94. knob
96. catch
98. cantilevered beam
100. one end
102. right-angled extension
104. lug
106. hook
108. closer side
110. farther side
112. follower
114. setting release button

What is claimed is:

1. A camera comprising a shutter release that is manually movable to initiate picture-taking, and a delayed action device for automatically moving said shutter release to initiate picture-taking after a predetermined interval of time has elapsed, is characterized in that:

said shutter release has an engageable portion that can be engaged to move the shutter release to initiate picture-taking; and said delayed action device has a setting piece that is movable in a forward direction to a cocked position to move an engaging portion of said setting piece from a closer side to a farther side of said engageable portion of the shutter release and is movable in a reverse direction with said engaging portion in engagement with said farther side to automatically move said shutter release to initiate picture-taking, and said engaging portion is constructed to allow said shutter release to be manually moved to initiate picture-taking when said setting piece is in the cocked position which makes movement of the setting piece in the reverse direction in order to automatically move the shutter release to initiate picture-taking unnecessary.

2. A camera as recited in claim 1, wherein a catch is located to engage said setting piece in the cocked position to prevent the setting piece from being moved in the reverse direction and is manually movable out of engagement with the setting piece to permit movement of the setting piece in the reverse direction.

3. A camera as recited in claim 2, wherein a resilient cantilevered beam supports said catch for the catch to engage said setting piece in the cocked position and is manually movable to move the catch out of engagement with the setting piece.

4. A camera as recited in claim 2, wherein said delayed action device has a timer that is capable of winding down for the predetermined interval of time and is coupled with said setting piece to move the setting piece in the reverse direction for the predetermined interval of time when said catch is moved out of engagement with the setting piece.

5. A camera as recited in claim 4, wherein said timer is adapted to be wound up to permit the timer to be wound down for the predetermined interval of time, and said setting piece is coupled with said timer for the setting piece to wind up the timer when the setting piece is moved to the cocked position.

6. A camera as recited in claim 4 wherein a main body part has one end portion that defines a cartridge receiving chamber and another end portion that defines a film roll chamber, and said setting piece and said timer are secured to one of said end portions.

* * * * *